Patented Nov. 2, 1926.

1,605,219

UNITED STATES PATENT OFFICE.

STUART L. CRAWFORD, OF ROCHESTER, NEW YORK.

FOOD COMPOUND.

No Drawing.   Application filed October 20, 1920.   Serial No. 418,317.

The object of this invention is to provide a new and improved form of food compound, and more especially a food compound from which jelly can be easily and quickly made and by the use of which jellies from many kinds of fruits can be made by the housewife which she has heretofore not been able to make.

This and other objects of the invention will be fully described in the specification and pointed out in the claims at the end thereof.

For the purpose of my invention I use pectin, preferably, of a given strength or consistency, with a concentrated fruit juice containing the natural flavor of the fruit, such as strawberry, pineapple, etc., from which the sugar has been removed. If in concentrating the fruit juice or flavor, the organic acid has been removed, as is frequently the case in commercial flavors, I then replace the organic acid with another organic acid, such as lactic acid or citric acid.

It is now well known that fruit jelly is made by combining the following constituents: namely, a fruit juice which contains the necessary acid, flavor and pectin, to which juice is added sugar and water in the necessary amount. In the absence of either acid, pectin or sugar, jelly will not form. Pectin is a gummy substance or a substance much in the nature of a gum, which exists naturally to a greater or less extent in the juices or pulp of all fruits from which jelly can be made. Such fruits as do not have a sufficient amount of pectin in their juices cannot be used for the making of jelly unless pectin is added from another source. Grapes, currents and gooseberries have a very high percentage of pectin while pineapples, strawberries, cherries, raspberries, loganberries, etc., have very little or no pectin therein and from such fruits or their juices jelly cannot be made unless pectin derived from some other source is added thereto. Pectin exists naturally in apples or in the pomace derived therefrom at the cider mill and in the rind of oranges and many other sources not ordinarily used in the making of jelly from which the pectin can be extracted and this pectin, derived from other sources and freed from the characteristic flavor of the fruit or other source from which it is obtained, can be combined with the concentrated juice of any fruit deficient in pectin, together with sugar and water, and jelly will be made therefrom having the flavor of the fruit from which the juice is taken.

I have conceived the idea of combining with pectin taken from other sources, the concentrated flavor of any particular fruit, from which flavor the natural acid and sugar have been removed or greatly reduced. To this combination, I add an organic acid, such as lactic acid or citric acid, to replace the natural acid removed for the purpose of concentrating the fruit flavor. I may also add a vegetable color, if the color of the fruit flavor is deficient. The flavor, acid, pectin and coloring matter will, in each case, be combined in the correct amounts.

For the purpose of making an orange or lemon jelly, I extract the lemon oil or the orange oil from the rind of the fruit, free from acid or sugar, and make an emulsion therewith by adding to the oil gum tragacanth, gum arabic and water, and violently stirring them or agitating them. The emulsion so made is combined with the pectin and organic acid, and the combination so formed is used as a base for making jelly.

This combination can be bottled, sealed and sterilized, and kept indefinitely and sold with suitable instructions for the purchaser to make jelly therewith by adding thereto the correct amount of sugar and water and boiling or otherwise treating it to make jelly. Any of the old, well known jellies can be made in this way together with many new kinds of jellies which the housewife has not heretofore been able to produce.

The jelly will even form by mixing the elements cold in suitable proportions without the use of heat.

The fruit juices and the pectin can be extracted and kept separately or they can be combined, when the fruit juice and pectin are in season or at other times and bottled.

It is also understood that the combination of fruit juice or flavor and pectin and acid, etc., occupies but a fraction of the space that is filled by the jelly made therefrom. Ordinarily 8 oz. of the combination will make 50 oz. of jelly, the increase in volume being made by the addition of sugar and water. The combination can be used at any time thereafter for the making of jelly, it being understood that sugar and water are accessible at any time while the fruit juices and pectin are not accessible unless especially prepared as above noted.

The foregoing compound with a particular flavor may be made up as follows:

For example. The compound for making cherry jelly as heretofore practised will comprise 2½ gallons of pectin syrup of from 6 degrees to 8 degrees Baumé, 11½ ounces or more of concentrated cherry flavor, 1½ ounces or more of citric acid and one-quarter or more of vegetable coloring matter.

For the purpose of making strawberry jelly, the compound will comprise 2½ gallons of pectin syrup, 9 ounces or more of concentrated strawberry flavor, 2 ounces or more of citric acid and ½ ounce or more of vegetable coloring matter.

It will also be understood that these proportions can be varied from within considerable limits and satisfactory results obtained therefrom. It will also be understood that the compound so made will be sterilized and sealed in bottles and 8 ounces of this mixture with two pounds of sugar and one pint of water will make about 50 ounces of jelly.

It will also be understood that pectin is ordinarily sold in the form of a syrup of the consistency above mentioned and it will also be understood that for citric acid any of its equivalents may be used, namely, lactic, malic or tartaric acid.

I claim:

1. As a new product, a liquid pure fruit compound for making pure fruit jellies almost instantaneously by merely adding said compound to a hot solution of sugar and water with very little or no boiling, said compound consisting of a concentrated pectin solution, concentrated fruit extract and fruit acid, this compound being characterized by the fact that, when a predetermined quantity thereof is stirred into a sufficiently hot solution of definite amounts of sugar and water, said compound almost instantaneously mixes with the solution of sugar and water and upon cooling produces a pure fruit jelly having substantially all the characteristics of flavor, set and clearness of jelly made from the juices of fresh fruit by long-continued boiling.

2. As a new product, a liquid pure fruit compound for making pure fruit jellies with certainty by merely adding said compound to a proper solution of sugar and water, said compound consisting of a concentrated pectin solution, concentrated fruit extract and fruit acid in such proportion that mixing a definite quantity of said compound with definite quantities of sugar and water produces a jelly of proper and uniform consistency and having all the necessary characteristics of jelly made from fresh fruit by long-continued boiling.

3. As a new product, a liquid pure fruit compound for making pure fruit jellies almost instantaneously by merely adding said compound to a hot solution of sugar and water with very little or no boiling, said compound consisting of a concentrated pectin solution, concentrated fruit extract and an edible acid to replace the original fruit acid in which the fruit extract is deficient, this compound being characterized by the fact that, when a predetermined quantity thereof is stirred into a sufficiently hot solution of definite amounts of sugar and water, said compound almost instantaneously mixes with the solution of sugar and water and upon cooling produces a pure fruit jelly having substantially all the characteristics of flavor, set and clearness of jelly made from the juices of fresh fruit by long-continued boiling.

4. As a new product, a liquid pure fruit compound for making pure fruit jellies with certainty by merely adding said compound to a proper solution of sugar and water, said compound consisting of a concentrated pectin solution, concentrated fruit extract and an edible acid to replace the original fruit acid in which the fruit extract is deficient said ingredients being in such proportion that mixing a definite quantity of said compound with definite quantities of sugar and water produces a jelly of proper and uniform consistency and having all the necessary characteristics of jelly made from fresh fruit by long-continued boiling.

5. As an article of manufacture, the combination of pectin obtained from one source and a concentrated fruit flavor from any particular fruit from which flavor the natural acid and sugar have been removed or greatly reduced and organic acid obtained from another source and used to replace the natural acid removed for the purpose of concentrating the fruit flavor, said combination being sterilized in liquid form and sealed, said combination being characterized by the fact that when the combination thereof is mixed with definite quantities of sugar and water, it quickly produces a jelly of proper and uniform consistency having all the necessary characteristics of jelly made from fresh fruit by long continued boiling.

6. As an article of manufacture, the combination of pectin obtained from one source and a fruit flavor and organic acid obtained from another source, said combination being sterilized in liquid form and sealed, said combination being characterized by the fact that when the combination thereof is mixed with definite quantities of sugar and water, it quickly produces a jelly of proper and uniform consistency having all the necessary characteristics of jelly made from fresh fruit by long continued boiling.

In testimony whereof I affix my signature.

STUART L. CRAWFORD.